United States Patent [19]

Kojima

[11] Patent Number: 5,649,263
[45] Date of Patent: Jul. 15, 1997

[54] PHOTOGRAPHIC PROCESSING APPARATUS

[75] Inventor: Masayuki Kojima, Wakayama, Japan

[73] Assignee: Noritsu Koki Co., Ltd., Wakayama, Japan

[21] Appl. No.: 579,576

[22] Filed: Dec. 26, 1995

[30] Foreign Application Priority Data

| Dec. 26, 1994 | [JP] | Japan | 6-337212 |
| Dec. 26, 1994 | [JP] | Japan | 6-337213 |
| Dec. 26, 1994 | [JP] | Japan | 6-337214 |

[51] Int. Cl.$^6$ .................................. G03D 3/08
[52] U.S. Cl. ................ 396/612; 396/617; 355/27
[58] Field of Search .................. 354/319–322, 354/324, 339, 340; 355/75, 76, 27–29, 38; 396/612, 617, 620, 622; 271/14, 84, 302

[56] References Cited

U.S. PATENT DOCUMENTS

| 4,903,068 | 2/1990 | Shiota | 355/38 X |
| 5,113,351 | 5/1992 | Bostic | 364/474 |
| 5,374,972 | 12/1994 | Nakane et al. | 396/613 |
| 5,452,050 | 9/1995 | Ishikawa et al. | 355/27 |
| 5,455,653 | 10/1995 | Shimamura et al. | 396/612 |

*Primary Examiner*—D. Rutledge
*Attorney, Agent, or Firm*—Oblon, Spivak, McClelland, Maier & Neustadt, P.C.

[57] ABSTRACT

A photographic processing apparatus including at least a printer section and a printing paper developing section further includes a printing paper transport apparatus having a mechanism which holds printing paper received from the printer section, slides the printing paper to the printing paper developing section, and delivers the printing paper thereto. The photographic processing apparatus is preferably provided with an index printer and an enveloper to implement effective continuous processing. In the printer section of the photographic processing apparatus, a scanner and a lens are disposed in different positions on a negative film conveying line, and an optical path changeover mirror is provided which is capable of changing the facing direction of the reflecting surface thereof in two directions with respect to the optical axis of one light source lamp. Also, reflecting mirrors are adequately provided in an optical path for supplying light to a frame on negative film opposed to the scanner or to a frame on the negative film opposed to the lens.

3 Claims, 6 Drawing Sheets

PHOTOGRAPHIC PROCESSING APPARATUS

BACKGROUND OF THE INVENTION

1. Field of the Invention

The present invention relates to a photographic processing apparatus having a film developing section, a printer section for printing an image recorded on a film onto printing paper, a printing paper developing section, and the like, and in particular to a photographic processing apparatus wherein the printer section is provided with a scanner for measuring density and other properties of negative film so as to automatically adjust exposure based on the measured data.

2. Description of the Related Art

With advancing photographic processing techniques, photographic processing apparatus are now popular which can perform continuous processing of film development, printing, and printing paper development. In some photographic processing apparatus, a continuous printing process is performed by linking a transport path in a printer section for printing an image onto a printing paper and a transport path in a developing apparatus for developing the printing paper. In some other photographic processing apparatus, a transport path in a film developing section, a transport path in a printer section, and a transport path in a printing paper developing section are all linked together.

In the film developing section, an undeveloped film is conveyed by using a leader and is sequentially passed at an appropriate processing rate through processing solution tanks containing processing solutions such as developer, fixer and the like suited for physicochemical properties of the film and then through a drying section, thereby developing the film. In the printer section, a negative film is set in a negative film mask, and printing paper on an exposure stage is exposed to light emitted from a light source, thereby exposing an image onto the printing paper.

In the printing paper developing section, the exposed printing paper is conveyed by means of rollers, guides and the like and sequentially is passed at an appropriate processing rate through processing solution tanks containing processing solutions such as developer, fixer and the like suited for physical properties of the printing paper and a drying section using warm air.

In the developing sections, photosensitive materials, i.e. the film and the printing paper are transported in a zigzag course through the processing solution tanks so as to lengthen their path within the processing solutions, thereby improving efficiency of development and decreasing the size of the photographic processing apparatus.

In the printer section, a scanner or the like is used to automate frame feed and exposure adjustment for the negative film. The printing paper is pulled out from a magazine loaded with roll printing paper and cut to a predetermined size, and thus cut printing paper is fed to the exposure stage, thereby improving work efficiency.

Conventional photographic processing apparatus are classified into two types according to arrangement of the printer section and the printing paper developing section. In the first type of photographic processing apparatus, the printer section and the printing paper developing section are lined on a common plane, thereby making the conveying path for a photosensitive material straight. Because of the straight conveying path and an associated simple structure, a photographic processing apparatus of this type can be fabricated in subassemblies, and the fabricated subassemblies can be combined at the time of installation. This facilitates transport and maintenance. When the film developing section is included in the photographic processing apparatus, the film developing section, the printer section, and the printing paper developing section are lined in the order of photographic processing.

In the second type of photographic processing apparatus, the printer section is disposed above the printing paper developing section. Because of integrated arrangement of these two sections, this type can be rendered compact. When the film developing section is included in the photographic processing apparatus, the film developing section and the printing paper developing section are arranged side by side, and the printer section is disposed above the printing paper developing section. In the aforesaid two types, the film developing section, the printer section, and the printing paper developing section are arranged such that the conveying paths of film and printing paper extend on a single plane.

In the printer section of the photographic processing apparatus capable of performing the aforesaid continuous processing, light from a light source is applied to a developed negative film and an image on the film for printing is focused on the printing paper through a lens. Density and color balance of the negative film depend on photographic conditions. For obtaining photographs with good image reproducibility, density and color corrections are needed to adjust light intensity and color balance.

When an operator performs the exposure adjustment manually, he/she should have ample experience and skilled techniques because the exposure adjustment is a quite difficult work to perform, as it involves determining density and color balance by observing on the negative film an image which is reverse in light intensity and color to a subject. To automate processing work and allow even those operators having little experience to obtain prints of the same quality, photographic processing apparatus are fabricated in which a printer is provided with a scanner for automatically correcting density and color.

The scanner scans an image on the negative film from the side opposite to a scanner light source to obtain photometric data regarding patterns, density, and colors. The photometric data is compared with reference values to calculate exposure correction data. Based on the exposure correction data, optimum exposure conditions are obtained. Under the optimum exposure conditions, an exposure light source, YMC (yellow-magenta-cyan) filters, and a shutter are controlled for printing. Thus, the printer section using the scanner requires an exposure light source and a scanner light source. Some conventional photographic processing apparatus have an exposure light source and a scanner light source in the printer section, and some other conventional photographic processing apparatus have one light source used for both exposure and scanning.

When there is a great difference between the quantity of light required for image exposure and the quantity of light required for the scanner, it is beneficial to prepare an exposure light source and a scanner light source independently of each other. When the exposure light source and the scanner light source are independently prepared, it is necessary to match printing and scanning conditions using light sources having the same tone, but this practice has the advantages that exposure control and scanning control are simple and that processing capability is high.

To increase accuracy of exposure adjustment, using the same light source for exposure and scanning is advantageous. This method reduces costs associated with the printer section and contributes toward decreasing the size of the apparatus. When the negative film is moved frame by frame for alternate scanning and printing, this method involves steps of adjusting the quantity of light, opening/closing a lens shutter, and alternately retreating the scanner and lens. When a plurality of frames on the negative film are continuously scanned before initiating printing, this method involves such an operation that the negative film is once advanced for scanning, then retreated, and then advanced again for printing.

The conventional photographic processing apparatus described above are arranged only in consideration of the linkage between conveying paths of apparatus sections. As a result, the conveying paths are mutually dependent, and thus apparatus sections are not completely independent of one another. In such photographic processing apparatus, any section cannot be changed or modified in accordance with a required processing capability, because possible combinations of the film developing section, the printer section, and the printing paper developing section are limited.

In particular, since the conveying path between the printer section and the printing paper developing section lies on the same line, no space is available for mounting additional devices such as an index printer, i.e., an ink Jet or another type printer for printing indices on printing papers, and an enveloper for automatically enveloping the negative film, thus preventing the entire photographic process, ending with an enveloping process, from being fully automated.

The use of a single light source as both an exposure light source and a scanning light source is suited for reducing the size of the printer section, but involves complicated control over film feed in printing and scanning with a resultant deterioration during processing capability.

SUMMARY OF THE INVENTION

An object of the present invention is to provide a photographic processing apparatus whose processing sections are mutually independent in structure, enabling simple maintenance and the mounting of other peripheral apparatus, and which is compact and simple in its control of conveyance of film.

According to the present invention, a photographic processing apparatus provided with at least an automatic splicing mechanism, a printer section, and a printing paper developing section includes a printing paper transport apparatus having a mechanism which holds printing paper received from the printer section, slides the held printing paper to the printing paper developing section, and delivers the printing paper thereto.

Preferably, the photographic processing apparatus is provided with an index printer and an enveloper to implement effective continuous processing.

Preferably, in the printer section according to the present invention, a scanner and a lens are disposed in different positions on a conveying line of negative film, and an optical path changeover mirror is provided which is capable of changing the facing direction of the reflecting surface thereof in two directions with respect to the optical axis of one light source lamp. Also, reflecting mirrors are adequately provided in an optical path for supplying light to a frame on negative film opposed to the scanner or to a frame on the negative film opposed to the lens.

In the photographic processing apparatus of the present invention, since the printing paper is slid in a direction intersecting with the direction of transport in the printer section and the direction of transport in the printing paper developing section, the printer section and the printing paper developing section can be disposed independently of each other. Accordingly, the size of the apparatus can be decreased by arranging the printer section and the printing paper developing section in parallel, for example. Also, an adequate printer section and an adequate printing paper developing section can be combined in accordance with required work and capability. When the photographic processing apparatus is to be Upgraded, required components can be promptly replaced, thereby minimizing costs.

Since the printing paper transport apparatus transfers the printing paper from the printer section to the printing paper developing section, it is not necessary for the individual processing sections to employ a complex internal structure, thereby decreasing the size of the apparatus. Further, because of easy split fabrication and easy assembly and disassembly, maintenance, transport, and installation are easy to practice.

Also, the use of the printing paper transport apparatus for transferring the printing paper from the printer section to the printing paper developing section allows the processing sections to be structurally independent of each other. This allows peripheral apparatus, such as a paper stocker for temporarily storing undeveloped printing paper, to be mounted. Also, by employing an automatic film unwinding mechanism for a film magazine, or the like, photographic processing ranging from the loading of undeveloped film through enveloping can be fully automated.

In the photographic processing apparatus of the present invention, the printer section uses the same light source for exposure and scanning, but exposure and scanning are performed in different positions, whereby there is no need for exercising control for advancing or retreating the negative film, for example. This simplifies control over exposure and scanning, thereby improving processing capability.

BRIEF DESCRIPTION OF THE DRAWINGS

Various other objects, features and many of the attendant advantages of the present invention will be readily appreciated as the same becomes better understood by referring to the following detailed description of the preferred embodiments when considered in connection with the accompanying drawings, in which.

DESCRIPTION OF THE PREFERRED EMBODIMENTS

A printing paper transport apparatus for use in a photographic processing apparatus according to the present invention includes a printing paper holding member for receiving printing paper from a printer section and driving means for moving the printing paper holding member in a reciprocating manner between the transfer path in the printer section and the transport path in a printing paper developing section. Applicable driving means for the printing paper holding member include slide screws, slide rails, belts, and any other means capable of providing a reciprocal movement.

In an integrated photographic processing apparatus which includes a film developing section, a printer section, and a printing paper developing section and which performs a photographic continuous-process, the conveying paths of the film developing section and the printing section are linked together, and the printing paper transport apparatus is provided between the printer section and the printing paper developing section.

The printing paper conveying path of the printer section is substantially in parallel with that of the printing paper developing section, and printing paper in the printing paper transport apparatus moves in a direction substantially perpendicular to the aforesaid printing paper conveying paths, thereby decreasing the size of the apparatus.

In the printer section according to the present invention, a scanner and a lens are disposed in different positions on a negative film conveying line, and there is provided an optical path changeover mirror which is capable of changing the facing direction of the reflecting surface thereof in two directions with respect to the optical axis of one light source lamp. Reflecting mirrors are adequately provided in an optical path for supplying light to a frame on negative film opposed to the scanner or to a frame on the negative film opposed to the lens. The angle of the reflecting surface of the optical path changeover mirror and of the reflecting surfaces of the reflecting mirrors are set in such a manner that light perpendicularly passes a frame of the negative film opposed to the scanner in scanning and that light perpendicularly passes a frame of the negative film opposed to the lens while printing. The light source is provided with YMC filters for color adjustment as well as a diffusion box and an optical diffusion plate for preventing uneven luminous flux. When exposure and scanning require different quantities of light, a gray filter is placed in an optical path for adjusting the quantity of light.

First Embodiment

Figure 1:
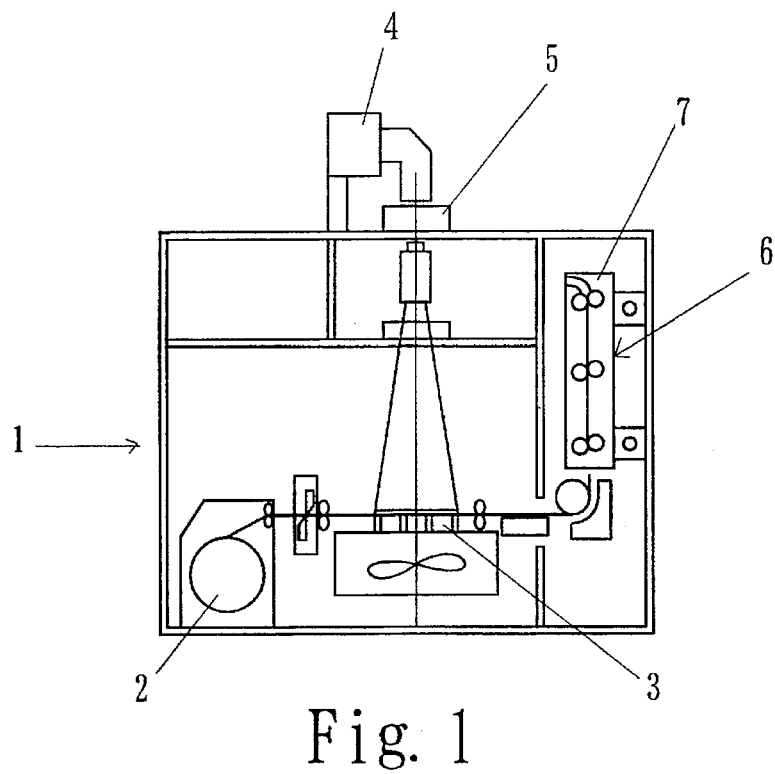
FIG. 1 is a cross-sectional view schematically showing a photographic processing apparatus according to a first embodiment of the present invention as viewed from the side of a printer section thereof.

A photographic processing apparatus according to an embodiment of the present invention will now be described. FIG. 1 is a cross-sectional view showing the photographic processing apparatus according to the present embodiment as viewed from the side of the printer section thereof. The photographic processing apparatus according to the present embodiment comprises a printer section and a printing paper developing section.

A printer section 1 has a magazine 2 loaded with roll printing paper, and the printing paper pulled out from the magazine 2 is cut by an automatic splicing mechanism to a predetermined size. Thus cut printing paper is placed on an exposure stage 3. An operator operates a light source 4 and a negative film mask 5 from outside the apparatus to perform printing on the printing paper placed on the exposure stage 3. The exposed printing paper is conveyed to a printing paper transport apparatus 6 and fed into a printing paper holding member 7. The printing paper holding member 7 receives the exposed printing paper in the illustrated position and then slides toward the far side of FIG. 1 (away from the viewer), thereby transferring the printing paper to a printing paper developing section.

Figure 2:
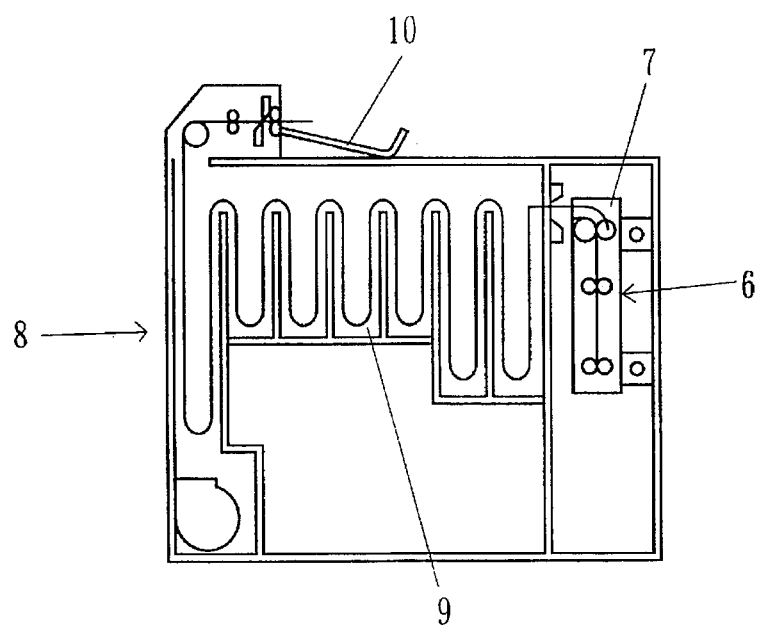
FIG. 2 is a cross-sectional view schematically showing the photographic processing apparatus according to the first embodiment as viewed from the side of a printing paper developing section thereof.

FIG. 2 is a cross-sectional view showing the photographic processing apparatus according to the present embodiment as viewed from the side of the printing paper developing section thereof. The printing paper fed to a printing paper developing section 8 moves through processing solution tanks 9 which contain developer, fixer and the like. On completion of development and then drying, the printing paper is discharged outside the photographic processing apparatus and stacked on a printing paper receiver 10 located on the top portion of the apparatus.

Figure 3:
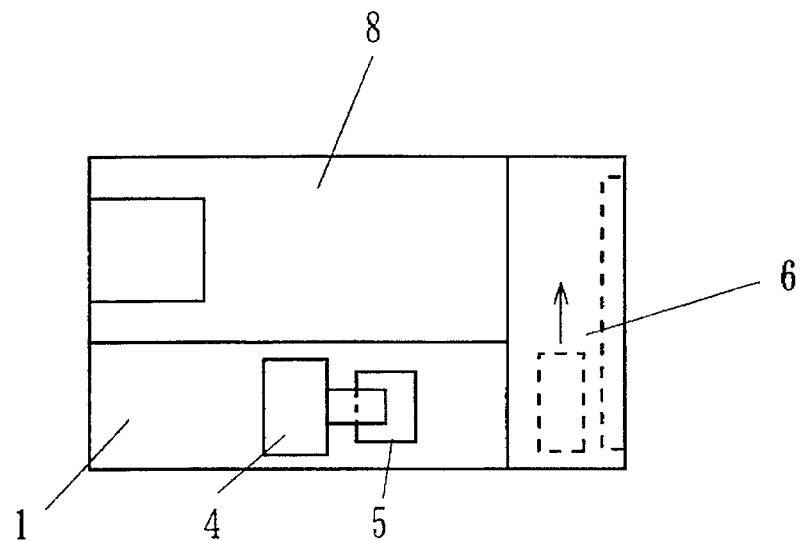
FIG. 3 is a schematic plane view of the photographic processing apparatus according to the first embodiment.

FIG. 3 is a schematic plane view of the photographic processing apparatus according to the present embodiment. The printer section 1 and the printing paper developing section 8 are arranged in parallel, and the printing paper transport apparatus 6 is connected to the printer section 1 and to the printing paper developing section 8.

The light source 4 and the negative film mask 5 are provided on the top surface of the printer section 1. According to the present embodiment, negative film is loaded into the negative film mask 5 from outside the photographic processing apparatus, and the light source 4 is operated. A photosensitive material is conveyed to the right side of the printer section 1. The printing paper holding member 7 slides in the direction of the arrow, and the printing paper(s) is(are) conveyed to the left side of the printing paper developing section 8.

Figure 4:
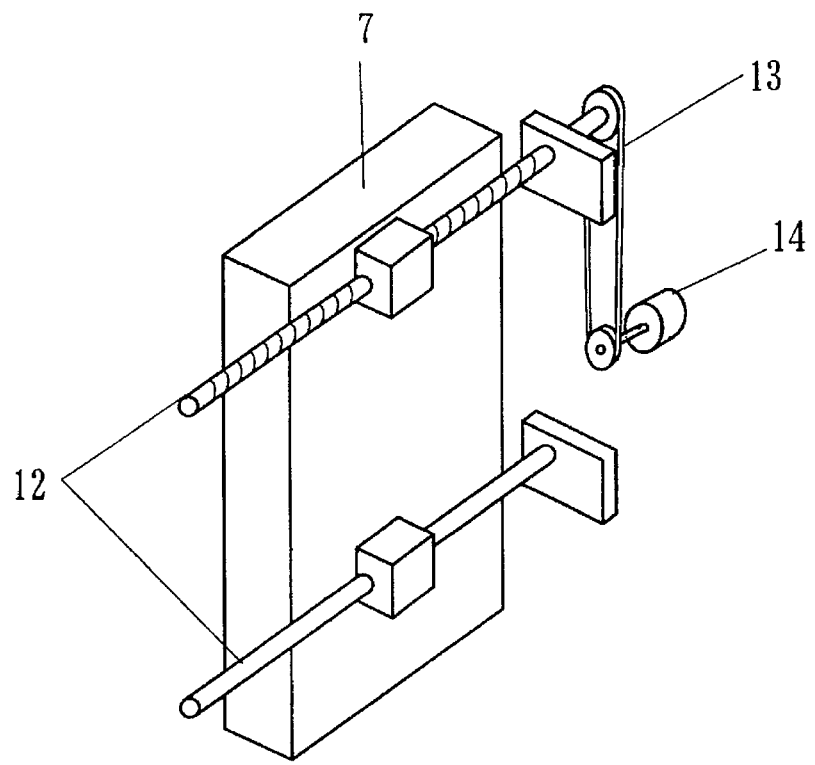
FIG. 4 is a perspective view showing a printing paper transport apparatus used in the photographic processing apparatus according to the first embodiment.

FIG. 4 is a perspective view showing the printing paper transport apparatus. The printing paper holding member 7 is engaged with two slide bars 12, and a motor 14 drives one of the slide bars 11 having a thread via a belt 13. As the slide bar 12 having a thread is rotated, the printing paper holding member 7 slides in a reciprocating manner. Driving means for the printing paper holding member 7 is not limited to that of the present embodiment. Means other than the threaded slide bar may be used.

Figure 5:
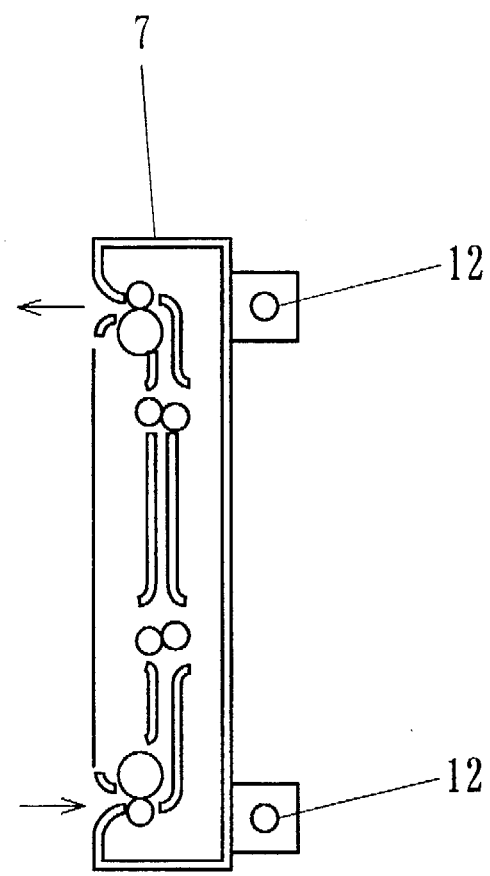
FIG. 5 is a cross-sectional view showing the printing paper transport apparatus used in the photographic processing apparatus according to the first embodiment.

FIG. 5 is a cross-sectional view showing the printing paper transport apparatus. In the printing paper holding member 7, a driving roller is provided at a receiving port for receiving the printing paper from the printer section and at a delivery port for delivering the printing paper to the printing paper developing section. Also, a conveying path is formed by a plurality of rollers and guides. Upon reception of the printing paper from the printer section, the printing paper holding member 7 is slid by rotating the slide bar 12 having a thread, thereby transferring the printing paper to the printing paper developing section.

Second Embodiment

A photographic processing apparatus according to another embodiment of the present invention will now be described.

Figure 6:
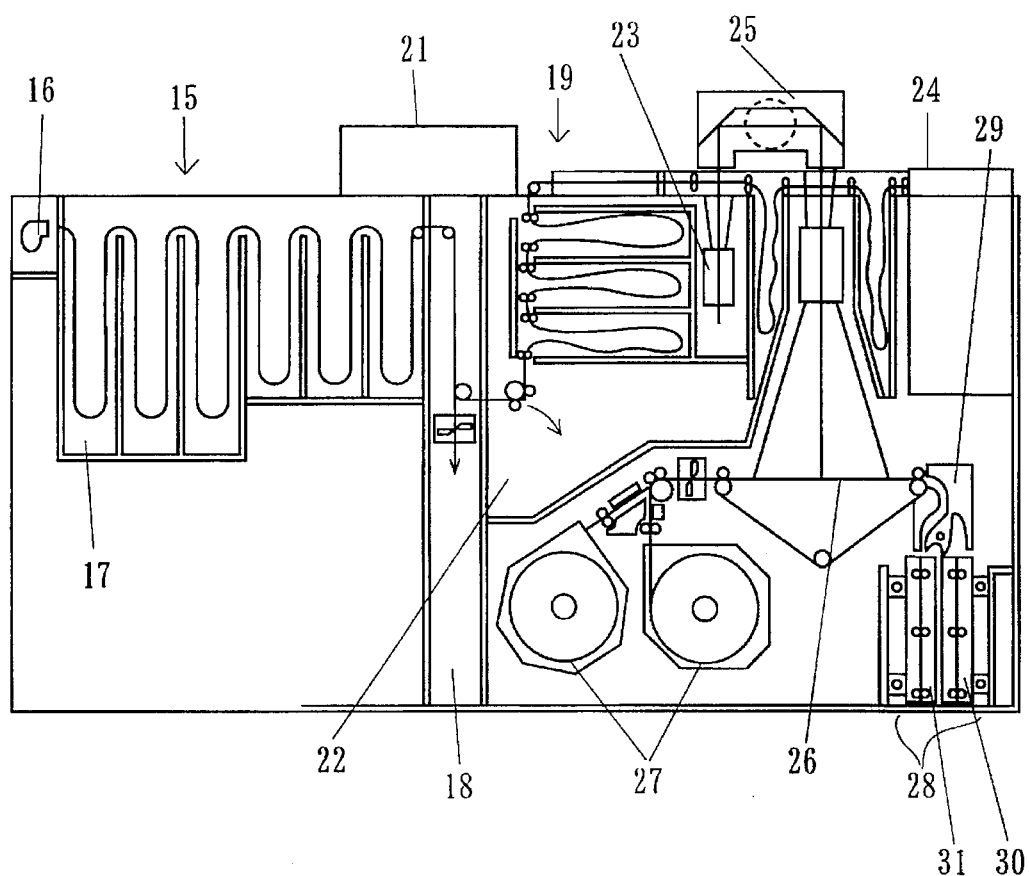
FIG. 6 is a cross-sectional view of the film developing section and the printer section of a photographic processing apparatus according to a second embodiment of the present invention.

The photographic processing apparatus according to the present embodiment comprises a film developing section, a printer section, and a printing paper developing section. FIG. 6 is a cross-sectional view of the film developing section and printer section of the photographic processing apparatus according to the present embodiment.

In the photographic processing apparatus according to the present embodiment, the film developing section and the printer section are arranged in series on one side thereof. A film unwinding mechanism and an automatic splicing mechanism are provided at the starting end of the conveying path of a film developing section 15. When a film magazine 16 is inserted, film is unwound and led into the film developing section 15.

In film processing solution tanks 17, the conveying path is formed by rollers, Guides and the like. On completion of development, a leader which has led the film conveyed is sent to a leader stocker 18, and the developed negative film is discharged from the film developing section 15 and sent to a printer section 19.

As shown in FIG. 6, stockers 21 and 22 are provided in two positions, namely, at the upper portion of the film developing section 15 and under the path for conveying the negative film to a negative film mask, so as to temporarily store the negative film which is required only to undergo development. The two stockers 21 and 22 may be selected in accordance with the type of film concerned.

After being conveyed along the meandering conveying path, the negative film reaches the negative film mask, where a scanner 23 reads information about each frame for use in adjusting printing conditions and in enveloping at an enveloper 24. On completion of printing, the negative film is sent to the enveloper 24 and enveloped there. A light source 25 according to the present embodiment has a single lamp which is used by both the scanner 23 and an exposure stage 26 by utilizing a movable reflecting member, not shown, thereby decreasing the size of the apparatus and reducing costs.

Magazines 27 loaded with roll printing paper are provided at the lower portion of the printer section 19. The printing paper which is pulled out from the magazine 27 and led to the exposure stage 26 is cut to a predetermined size, and thus cut printing paper is exposed. The exposed printing paper is sent to a printing paper transport apparatus 28 located at the lower right of FIG. 6.

In the present embodiment, the printing paper transport apparatus 28 has two transport lines. A conveyance changeover apparatus 29 provided at the entrance of the printing paper transport apparatus 28 selects either of the transport lines to feed the printing paper to a printing paper holding member 30 or 31 corresponding to the selected transport line. The printing paper holding member 30 or 31 receives the exposed printing paper and slides to the printing paper developing section, not shown.

Figure 7:
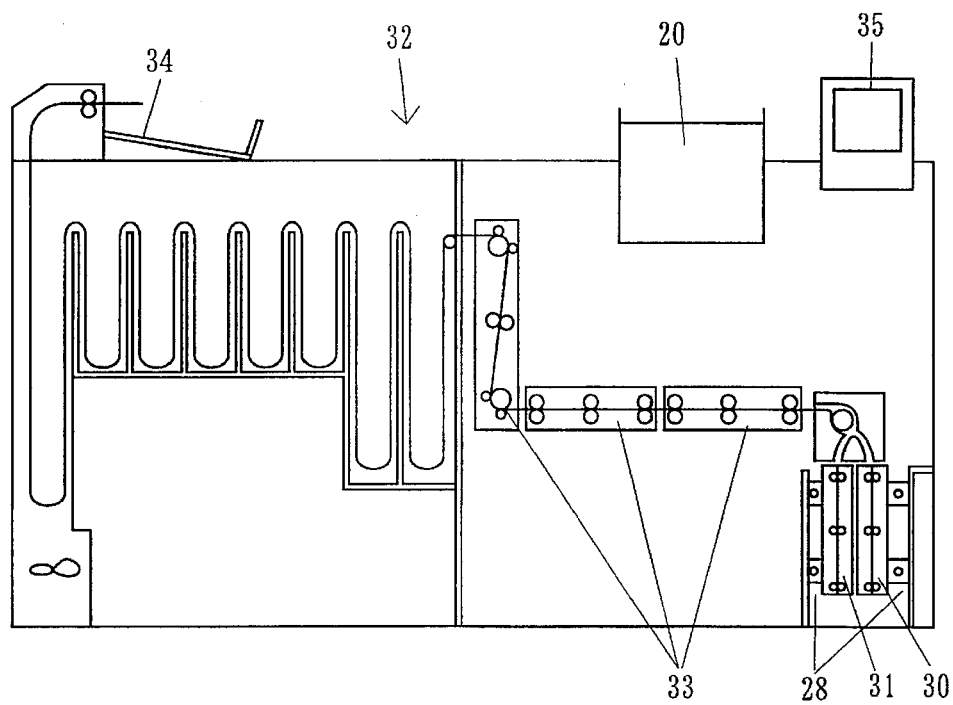
FIG. 7 is a cross-sectional view showing the photographic processing apparatus according to the second embodiment as viewed from the side of the printing paper developing section thereof.

FIG. 7 is a cross-sectional view showing the photographic processing apparatus according to the present embodiment as viewed from the side of the printing paper developing section thereof. The printing paper holding member 30 or 31 delivers the printing paper to a conveying path extending to the printing paper developing section 32.

The printing paper delivered from the printing paper holding member 30 or 31 is sent to a printing paper stocking-conveying apparatus 33. The printing paper transport apparatus for use in the photographic processing apparatus of the present invention is not limited to that according to the present embodiment, but may be any apparatus capable of moving the printing paper received from the printer section in a substantially perpendicular direction so as to transfer it to the printing paper developing section.

Since the printing paper stocking-conveying apparatus 33 can temporarily stock several pieces of printing paper all the time, it is possible to send the printing paper to the printing paper developing section 32 in accordance with the state of processing thereof. As a result of conveying a photosensitive material in meanders in apparatus and using the printing paper stocking-conveying apparatus 32, the photographic processing apparatus can perform a batch process in a single operation thereof.

An index number or the like can be printed on the printing paper residing in the printing paper stocking-conveying apparatus 33 by an index printer 20. The printing paper which has been sent from the printing paper stocking-conveying apparatus 33 to the printing paper developing section 32 undergoes development process and then is discharged outside the photographic processing apparatus. Thus discharged pieces of the printing paper accumulate on a printing paper receiver 34 located at the upper portion of the photographic processing apparatus. A monitor 35 is provided at the upper portion of the photographic processing apparatus for use in printing work or the like.

Figure 8:
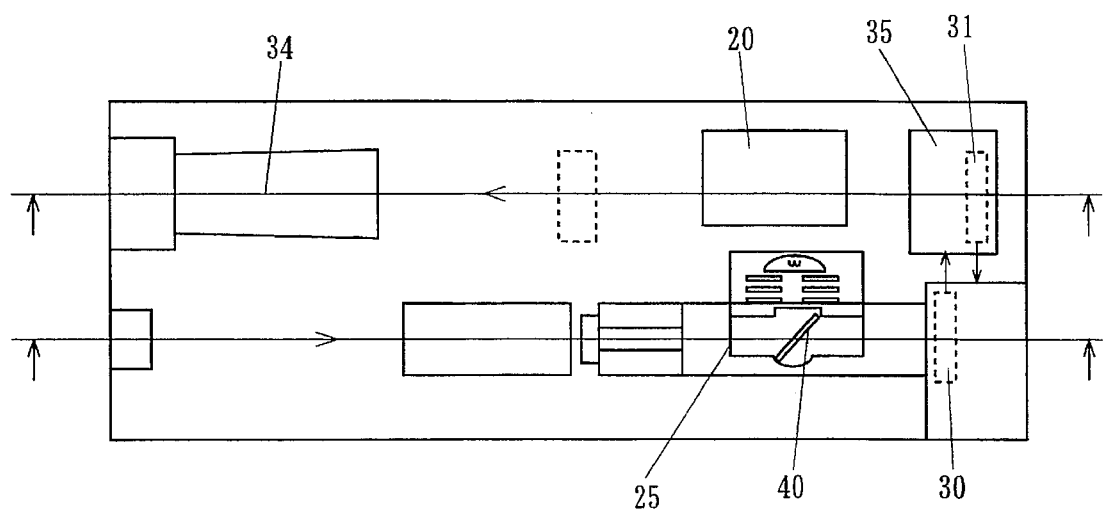
FIG. 8 is a top view of the photographic processing apparatus according to the second embodiment schematically illustrating mechanisms thereof.

FIG. 8 is a top view of the photographic processing apparatus according to the present embodiment schematically illustrating mechanisms thereof. The printing paper holding members 30 and 31 alternately slide between the printer section 19 and the printing paper developing section 32, thereby implementing efficient transfer of the printing paper.

Figure 9:
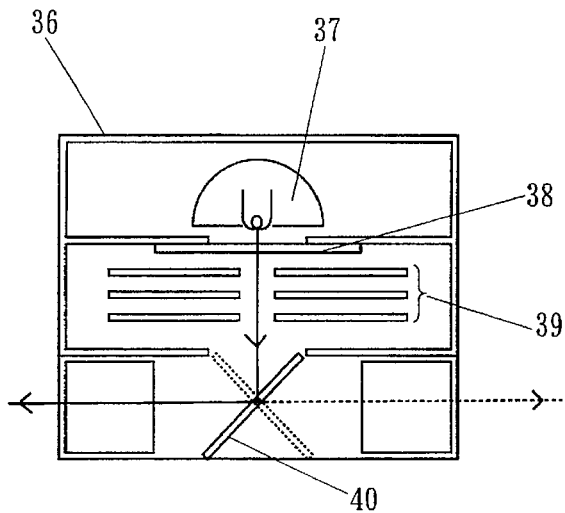
FIG. 9 is a cross-sectional view showing a light source section used in the photographic processing apparatus according to the second embodiment.

FIG. 9 is a cross-sectional view showing a light source section according to the present embodiment. The light source 25 has a light source lamp 37 in a housing 36. White light emitted from the light source lamp 37 passes through a glass plate 38 and YMC filters 39 and reaches an optical path changeover mirror 40, as indicated with an arrow in FIG. 9. The optical path changeover mirror 40 can switch facing directions thereof as illustrated with a solid transport line and a dotted line in FIG. 9.

The YMC filters 39 are for adjusting color of light. The YMC filters having an appropriate density are used for correcting the light of the light source lamp 37 to white light suited for printing. The housing 36 is provided with a fan, not shown, for cooling the light source lamp 37. The light of the light source lamp 37 is color adjusted with the YMC filters 39, and the optical path thereof is changed over with the optical path changeover mirror 40. As shown in FIG. 9, the optical path is directed to the scanner side as indicated with a solid line arrow or to the printing side as indicated with a dotted line.

Figure 10:
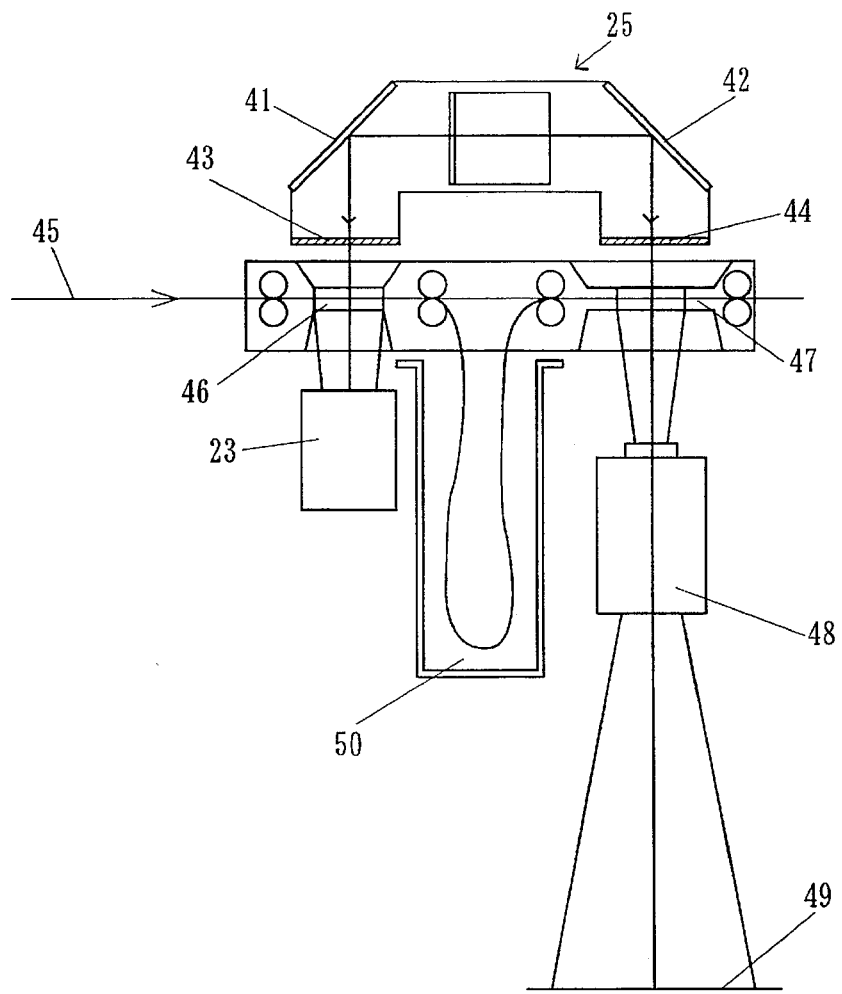
FIG. 10 is a cross-sectional view showing the printer section used in the photographic processing apparatus according to the second embodiment.

FIG. 10 is a cross-sectional view showing the printer section according to the present embodiment. The light source 25 is provided with reflecting mirrors 41 and 42 on the scanner side and on the printing side, respectively, at shoulder portions thereof. White light emitted from the light source is reflected at the optical path changeover mirror and directed to the scanner side or the printing side. The reflected white light is applied to a negative film 45 perpendicularly thereto via the reflecting mirror 41 and a light diffusion plate 43 or via the reflecting mirror 42 and a light diffusion plate 44.

The negative film 45 is conveyed from left to right as indicated with an arrow in FIG. 10. The scanner 23 is located opposite to the light diffusion plate 43 with respect to the negative film 45. The light applied to the negative film 45 via the light diffusion plate 43 passes through the negative film 45 and then is scanned by the scanner 23, which performs photometry on the scanned light.

Photometric data obtained by scanner 23 measuring the light which has passed through the negative film is compared with reference values to calculate exposure correction data. Optimum exposure conditions are obtained based on the exposure correction data. On completion of scanning and associated calculation of the optimum exposure conditions, the negative film undergoes printing.

A lens 48 is located opposite to the light diffusion plate 44 with respect to the negative film 45 held in a negative film mask 47. The negative film mask 47 holds a frame on the negative film 45 to be printed. The light which has passed through the light diffusion plate 44 is applied to a frame on the negative film 45 held in the negative film mask 47. The light which has passed through the frame is focused on a printing paper 49 via the lens 48.

A negative stock tank 50 provided between the scanner 23 and the lens 48 facilitates changing over scanning to and from printing. The negative stock tank 50 slackens and temporarily stores the negative film which has undergone photometry by the scanner 23, thereby adjusting a processing speed when the scanner 23 and the printer are greatly different in processing capability and allowing frames to somewhat advance or retreat.

Frames on the negative film can undergo photometry and printing one by one. However, the negative film may undergo photometry in a fixed lump unit, for example in the unit of a film magazine, and thus obtained photometric data may be temporarily stored and used for batch printing. This practice provides a higher work efficiency.

Obviously, numerous modifications and variations of the present invention are possible in light of the above teachings. It is therefore to be understood that within the scope of the appended claims, the present invention may be practiced other than as specifically described herein.

What is claimed is:

1. A photographic processing apparatus comprising:

a printer section having a conveying path;

a printing paper developing apparatus having a conveying path;

a printing paper transport apparatus having a mechanism which holds printing paper received from said printer section, slides the printing paper to said printing paper developing section, and delivers the printing paper thereto; and wherein the printing paper conveying paths of said printing section and said printing paper developing apparatus are substantially in parallel but with opposite printing paper forward conveying directions, and the printing paper held by said printing paper transport apparatus is slid in a direction substantially perpendicular to the forward conveying directions of the printing paper conveying paths.

2. A photographic processing apparatus comprising:

a printer section having a conveying path;

a printing paper developinq apparatus having a conveying path;

an index printer;

an enveloper; and a printing paper transport apparatus having a mechanism which holds printing paper received from said printer section, slides the printing paper to said printing paper developing apparatus, and delivers the printing paper thereto, wherein the printing paper conveying paths of said printer section and said printing paper developing apparatus are substantially in parallel but with each having respective opposite printing paper forward conveying directions, and the printing paper held by said printing paper transport apparatus is slid in a direction substantially perpendicular to the forward conveying directions of the printing paper conveying paths.

3. A photographic processing apparatus according to claims 1 or 2, wherein a position of measurement by a scanner and a position of exposure are located separately on a conveying line of negative film in said printer section, and said printer section has optical path changeover means for changing paths of light emitted from a light source so as to direct the light to either the position of measurement of a scanner or the position of exposure.

* * * * *